Jan. 9, 1940.    H. A. JONES    2,186,641
WELDING FRAME
Filed Dec. 16, 1938    2 Sheets-Sheet 1
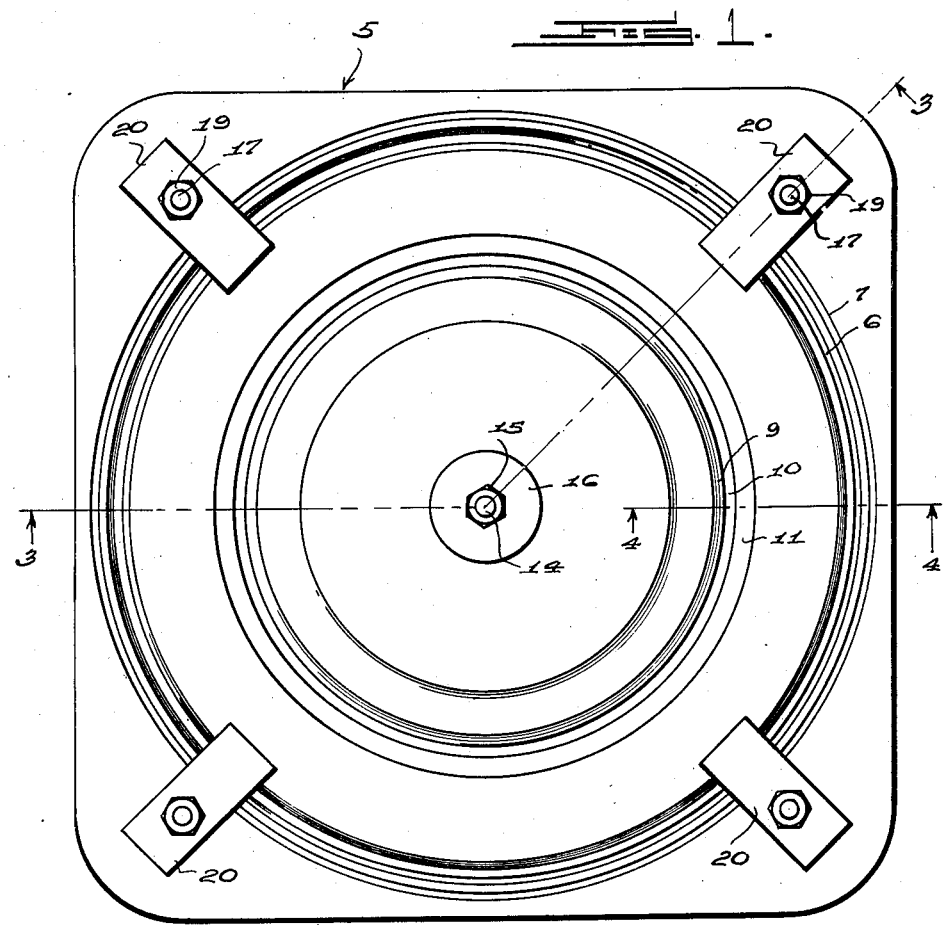
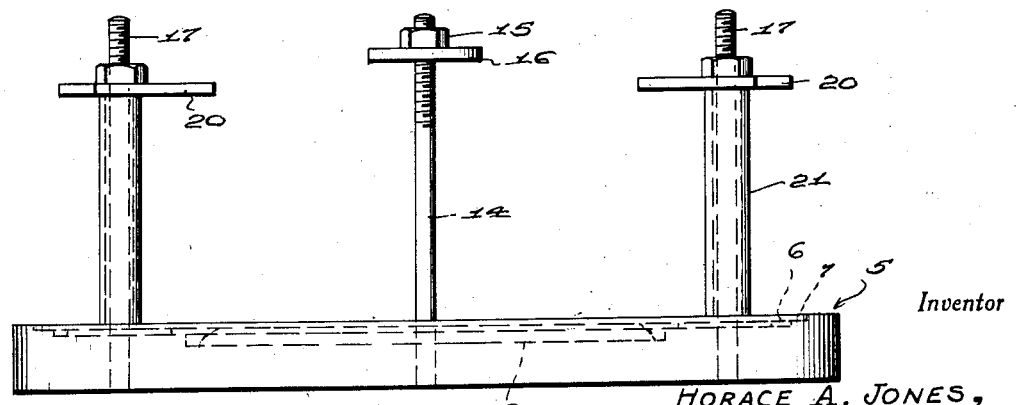
Inventor
HORACE A. JONES,
By Clarence A. O'Brien
and Hyman Berman
Attorneys Jan. 9, 1940.  H. A. JONES  2,186,641
WELDING FRAME
Filed Dec. 16, 1938  2 Sheets-Sheet 2

Inventor
HORACE A. JONES,

By Clarence A. O'Brien
and Hyman Berman
Attorneys

Patented Jan. 9, 1940

2,186,641

UNITED STATES PATENT OFFICE 2,186,641

WELDING FRAME

Horace A. Jones, Parsons, Kans.

Application December 16, 1938, Serial No. 246,239

1 Claim. (Cl. 113—99)

My invention relates generally to means for holding parts in substantially concentric relation with each other when welding elements between the same, whereby the concentric parts are securely held in proper relation during the welding operations and the cooling immediately consequent thereon, and an important object of my invention is to provide a simple and efficient arrangement of this character which is especially adapted to positively hold the rim of an automobile wheel concentric with respect to the hub or center of the wheel while welding wire spokes and the like between the rim and the center of the wheel.

Other important objects and advantages of my invention will be apparent from a reading of the following description taken in connection with the drawings wherein for purposes of illustration I have shown a preferred embodiment of my invention.

In the drawings—

Figure 1 is a general top plan view showing an arrangement in accordance with the invention.

Figure 2 is a side elevational view of Figure 1.

Figure 3:
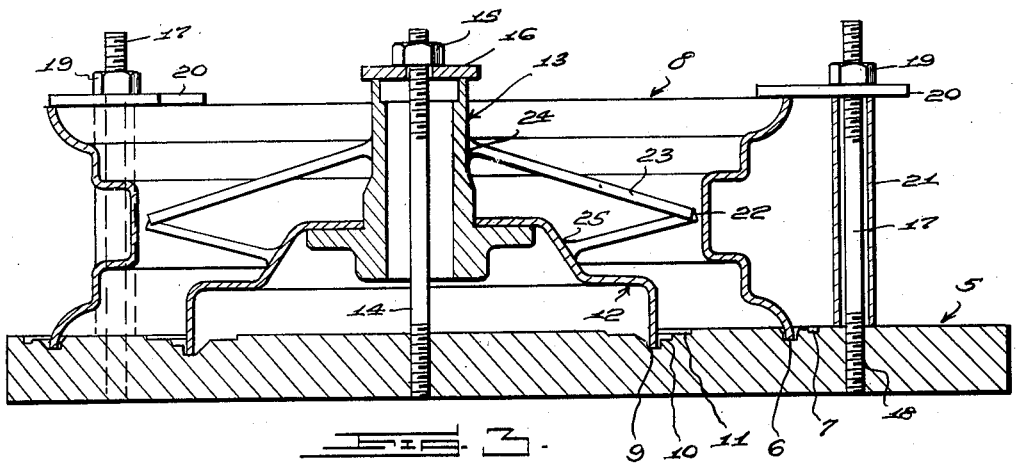
Figure 3 is a transverse vertical sectional view taken through Figure 1 approximately on the line 3—3 and looking upwardly in the direction of the arrows.
Figure 4:
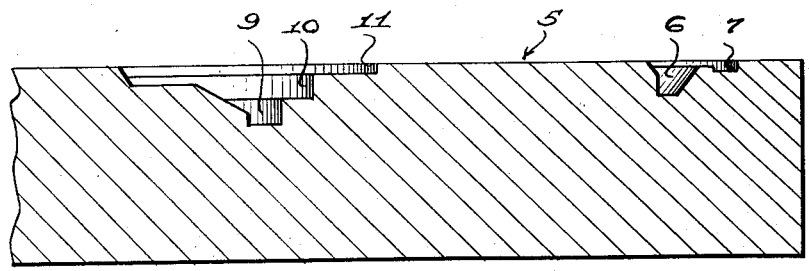
Figure 4 is an enlarged transverse vertical sectional view taken through Figure 1 approximately on the line 4—4 and looking upwardly in the direction of the arrows.

Referring in detail to the drawings, the numeral 5 generally designates a suitable base provided in its top with circular grooves 6 and 7, respectively, the groove 7 being spaced outwardly and concentrically with respect to the groove 6. Any suitable number of these grooves may be provided for receiving the edge of the automobile wheel rim 8 in the manner indicated in Figure 3 of the drawings. Radially inwardly spaced from the grooves 6 and 7 are the grooves 9, 10 and 11 which are circular and concentric with respect to each other and graded in depth as are the grooves 6 and 7, for the purpose of receiving different sizes of wheel centers such as that generally designated by the numeral 12 on which the usual wheel hub 13 is mounted in a conventional manner. A bolt 14 is located substantially at the center of the various circular grooves and threaded into the block 5 and on its upper end this bolt has a tightening nut 15 which works down upon a washer 16 which engages the upper end of the hub 13 as clearly shown, in order to positively hold the wheel center concentric with respect to the center of the axis of the bolt 14 and in the selected one of the grooves 9, 10 and 11 depending upon the diameter of the rim portion of the wheel center.

For convenience the block 5 may be generally square in plan as indicated in Figure 1 of the drawings and have located in each corner a bolt 17 which is threaded into the block as indicated by the numeral 18 and has on its upper end a tightening nut 19 which works down upon a radially extending lug 20 which, in turn, rests on a tubular spacer 21 which holds the lug 20 at the proper height above the base 5 to engage the adjacent edge of the rim 8, so as to hold the opposite edge of the rim in the appropriate one of the grooves 6 and 7 concentric with respect to the wheel center 12, the lugs 20 engaging the rim 8 at circumferentially spaced points so as to exert an equal holding effect thereon. Incidentally, the various grooves are graded in depth to accommodate edges of rims of different widths and hubs correspondingly proportioned with respect to the rim, so that the plane in which the junctions 22 where the spokes 23 are welded to the web of the rim 8 are located will be properly centered when the welding is performed relative to the points 24 and 25 of attachment to the hub or wheel center 12, respectively. By use of the device of the invention it is a fairly simple operation to reduce the diameter of an automobile wheel or to put a wider rim thereon for purposes of accommodating pneumatic tires of different sizes, by means available in an ordinary shop, and to do accurate and efficient work.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claim.

Having described the invention, what is claimed as new is:

A welding frame for assembling the rim and hub sections of automobile wheels comprising a flat base, substantially rectangular, said base having centered in the upper face thereof an outer series of circular concentric grooves of different diameters and depths, relatively, for seating rims of different sizes edgewise therein, respectively, a second series of concentric circular grooves of different diameters and depths, relatively, smaller than the grooves of the first series and concentric thereto for seating edgewise therein brake drums of hub sections of different sizes, means to secure rim sections selectively in the grooves of the first-mentioned series comprising rods arising from the corners of the base, respectively, outside said series of grooves and having nuts threaded onto the upper ends thereof, sleeves on said rods below said nuts, clamping arms loose on said rods between said nuts and sleeves for extending over a rim section for clamping thereto, said sleeves spacing said arms from said base, and means to selectively secure hub sections in the grooves of said second series comprising a rod upstanding from said base to extend through the hub and having a nut thereon and a washer for clamping by said nut against said hub sections.

HORACE A. JONES.